(12) United States Patent
Kuo

(10) Patent No.: US 6,585,417 B2
(45) Date of Patent: Jul. 1, 2003

(54) INTERCONNECTOR FOR ROLLING BALLS

(75) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 09/929,352

(22) Filed: Aug. 15, 2001

(65) Prior Publication Data

US 2002/0025088 A1 Feb. 28, 2002

(30) Foreign Application Priority Data

Aug. 24, 2000 (TW) ...................................... 89214608 U

(51) Int. Cl.[7] .............................................. F16C 29/04
(52) U.S. Cl. ......................................... 384/49; 384/526
(58) Field of Search .............................. 384/51, 49, 526, 384/531, 523

(56) References Cited

U.S. PATENT DOCUMENTS

| 4,004,840 A | * | 1/1977 | Johnston et al. | ............. 384/526 |
| 5,082,375 A | * | 1/1992 | Hillmann | .................... 384/526 |
| 5,387,041 A | * | 2/1995 | Lederman | ................... 384/531 |

* cited by examiner

Primary Examiner—Lenard A. Footland
(74) Attorney, Agent, or Firm—Bacon & Thomas, PLLC

(57) ABSTRACT

An interconnector for rolling balls in a ball screw or a linear guide way is composed of a spacer, a direction guiding member with two wings, and to linking chains. The adjacent rolling balls are isolated by the spacer so as to prevent mutual collision. The two adjacent spacers are connected with two elastically meandering linking chains able to be configurated in various forms so as to freely elongate and shrink. With this structure the guide way track is able to be formed into any shape which contributes to minimizing the size of apparatus and production cost, and allow the rolling ball to travel in a three dimensional course.

12 Claims, 3 Drawing Sheets

INTERCONNECTOR FOR ROLLING BALLS

BACKGROUND OF THE INVENTION

1. Field of the Invention

The present invention relates to an interconnector for rolling balls, and more particularly, to an interconnector used in a ball screw or a linear guide way for preventing adjacent rolling balls from impinging with each other.

2. Description of the Prior Art

Mutual impinging of rolling balls in a ball screw or a linear guide way causes noises and loss of useful mechanical power resulting in unexpected obstacle to machine operation. For improving such a problem, a plastic interconnector is employed for isolating adjacent rolling balls not to collide with each other. As the interconnector is formed in a belt structure, it is only able to provide a two dimensional planar path instead of a three dimensional path for balls to travel in a ball screw or a linear guide way as disclosed in U.S. Pat. Nos. 5,951,168 and 5,988,883. Unfortunately, most of the circulation systems for ball screws and linear guide ways require for a three dimensional path for movement of their rolling balls as pointed out in U.S. Pat. Nos. 5,429,439, 5,562,346 and 5,758,975. For a remedy, the conventional belt type interconnector was tried to be flexed into a desired shape. But owing to its want of flexibility, the interconnector constructed as such is difficult to be formed into a desired figure. As a result, the turning curvature of a ball circulation path will become too steep for balls to travel smoothly which causes the necessity of decreasing amount of load carrying balls and weakening load carrying capability of the apparatus for compensation.

SUMMARY OF THE INVENTION

Aiming at the above depicted defects, the present invention is to propose a newly developed interconnector for rolling balls for improving this situation.

It is an object of the present invention to provide an interconnector for rolling balls full of resiliency and flexibility whose linking chain is capable of bending in any direction and any figure instead of conventional belt type structure which can only flex in the direction of thickness and connect its head and end portions together to form an nearly annular circulation path.

It is another object of the present invention to provide an interconnector for rolling balls capable of preventing mutual collision of adjacent balls and causing noise.

It is one more object of the present invention to provide an interconnector for rolling balls capable of separating from die cavity after finishing die casting, providing means for positioning rolling balls in operation and impartment of lubrication oil between balls.

To achieve these and other objects described above, each interconnector of the present invention comprises a spacer, a direction guiding member, and a linking chain. The spacer is intervened between two adjacent balls so as to prevent them colliding with each other and eliminate noises as well. The two adjacent spacers are linked with two linking chains formed meandering therebetween, the linking chain is made of an elastic material with sufficient resiliency to elongate and shrink so as to impart the two adjacent spacers an elastic force to retain a ball therebetween such that the rolling ball is assured not to slip away in the case when no extraneous force is applied. In order to prevent the linking chains from shagging disorderly and twisting around the rolling balls or the guide way, two flat direction guiding wings are provided for each spacer to clog in gaps at both sides of the guide way track so as to guide the linking chains traveling in the right direction and not to stray into the track due to collapsion.

In the present invention, the meandering linking chain may be formed into variety of configurations, such as a sinuous form, a serrated form, or a trapezoidal form that is able to serve with an excellent elongation and shrinkage effects.

In the present invention, the two wings of the direction guiding member are formed tapering towards the terminal ends thereof so that the two adjacent direction guiding members do not interfere with each other in case the interconnector is inclined or flexed.

Besides, in order to facilitate separating the interconnector from the die cavity after finishing die casting, a through hole is drilled at the center of the spacer for this purpose, and additionally provides means for positioning rolling balls during operation and imparting lubrication oil between the balls.

BRIEF DESCRIPTION OF THE DRAWINGS

To enable a further understanding of the innovative and technological content of the invention herein, refer to the detailed description of the invention and the accompanying brief description of the drawing appended below in which.

DETAILED DESCRIPTION OF THE PREFERRED EMBODIMENT

Figure 1:
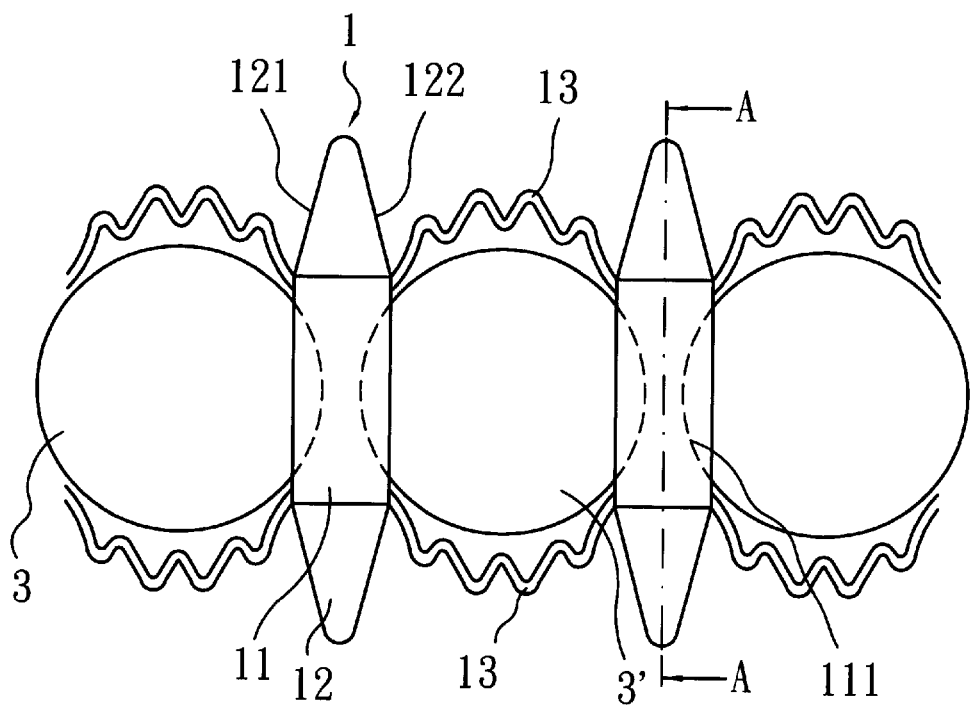
FIG. 1 is a schematic view in a first embodiment of the present invention.

FIG. 1 is a schematic view in first embodiment of the present invention. As shown in FIG. 1, the interconnector 1 is composed of a spacer 11, a direction guiding member 12, and two linking chains 13. Two rolling balls 3 and 3' rolling along the track are separated by the spacer 11 so as to prevent mutual collision of the two balls 3 and 3'. Both side surfaces of each spacer 11 facing against the track are formed into an inwardly recessed meniscoid contact surfaces 111 to retain the rolling balls 3 and 3' therein. The two adjacent spacers 11 are connected with two elastically meandering linking chains 13 so as to provide a resilient force therebetween thereby relevantly holding the rolling ball 3 or 3' between the two adjacent spacer contact surfaces 111. In FIG. 1, the linking chain 13 is configurated into a sinuous form so as to serve better elongation and shrinkage effects. Incidentally, the cross section of the spacer 11 can be formed into a circular or a rectangular shape.

Figure 2:
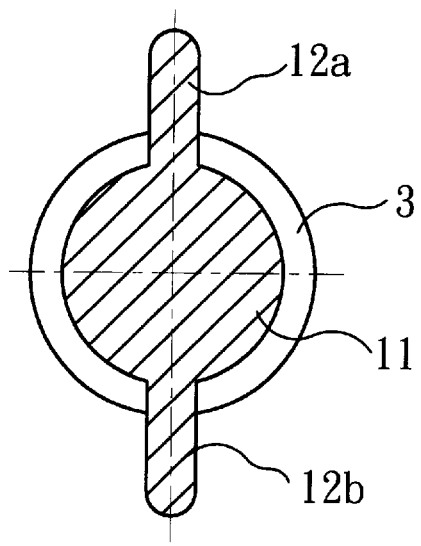
FIG. 2 is the cross sectional view along line A—A of FIG. 1.

Referring to FIG. 2, the cross sectional view along line A—A of FIG. 1, in order to prevent the linking chains 13 from shagging disorderly and twisting around the rolling balls 3 and 3' or the guide track, two flat direction guiding wings 12a and 12b of the direction guiding member 12 are provided for each spacer 11 to clog in gaps at both sides of the guide way track so as to guide the linking chains 13 proceeding along the right direction and not to stray away from its normal path into the guide way track due to collapsion. Besides, the direction guide wings 12a and 12b are symmetrically situated in the gaps at both sides of the guide way tracks with respect to the spacer 11 so that they can also control the advancing direction of the spacer 11. The thickness of the wings 12a, 12b are approximately the same as that of the linking chain 13.

Figure 3:
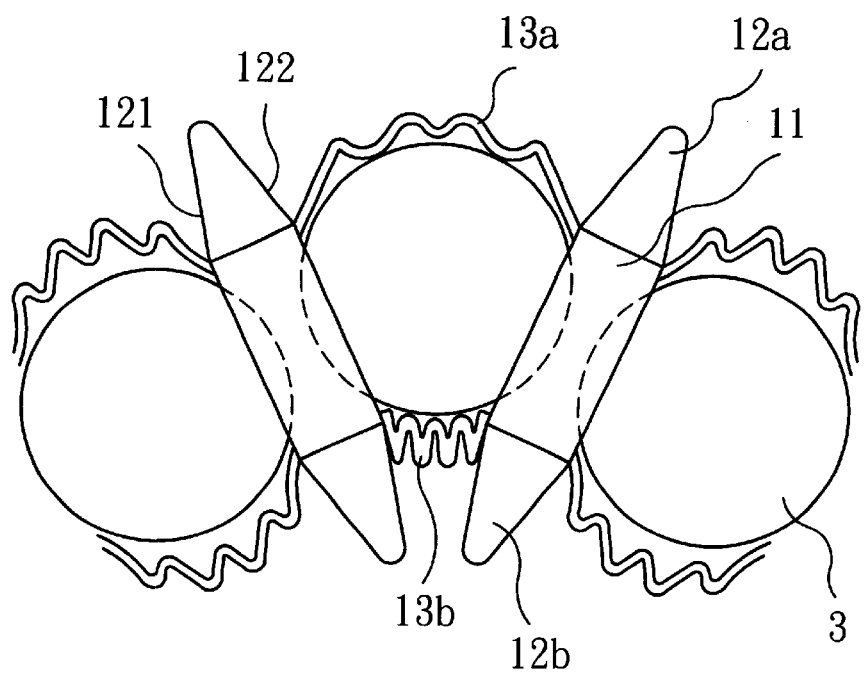
FIG. 3 is a schematic view showing a state of two adjacent interconnectors for rolling balls in a curved path according to the present invention.

FIG. 3 is a schematic view showing a state of two adjacent inverconnectors in a curved path. As shown in FIG. 3, the path is curved concave upwardly such that the upper linking chain 13a is elongated while the lower one 13b is squeezed to shrink. In this version the linking chains 13a, 13b are free to flex in any direction and satisfy the three dimensional movement of the rolling balls 3 and 3' that the conventional technique can not attain. It is noticeable that when rolling balls are traveling along a concave upward path as that is shown is FIG. 3, the adjacent lower direction guiding wings 12b are apt to interfere with each other. In order to eliminate such a shortcoming, the two edges 121 and 122 of the direction guiding wings 12a, 12b are formed tapering towards their ends thereof to make room for preventing aforesaid incident.

Figure 4:
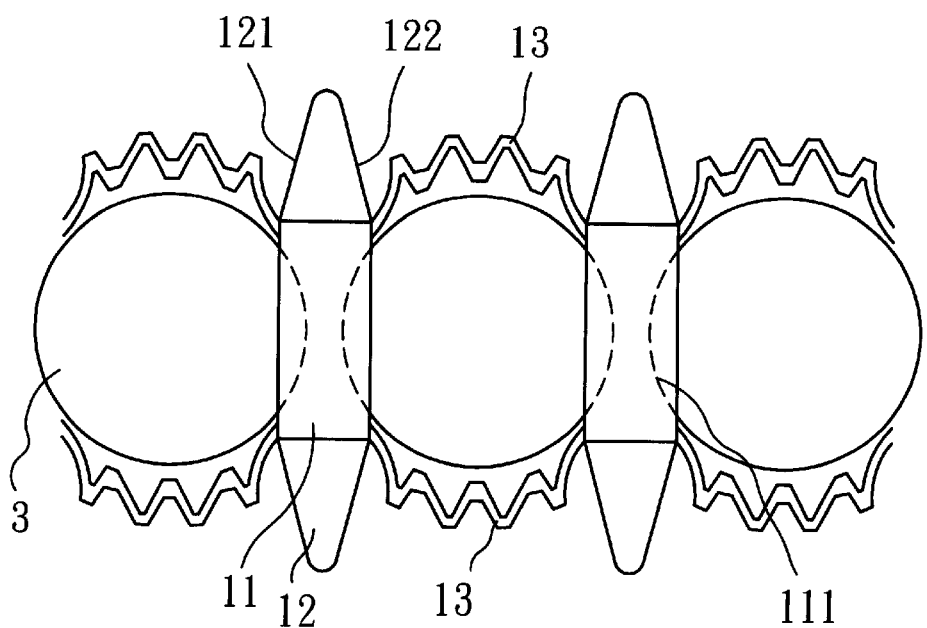
FIG. 4 is a schematic view in a second embodiment of the present invention.

FIG. 4 is a schematic view in a second embodiment of the present invention. In this embodiment, the linking chain 13 is configurated into a serrated form. It has also excellent elasticity for elongation and shrinkage, and is easy to construct, of course other form such as a trapezoid is possible.

Figure 5:
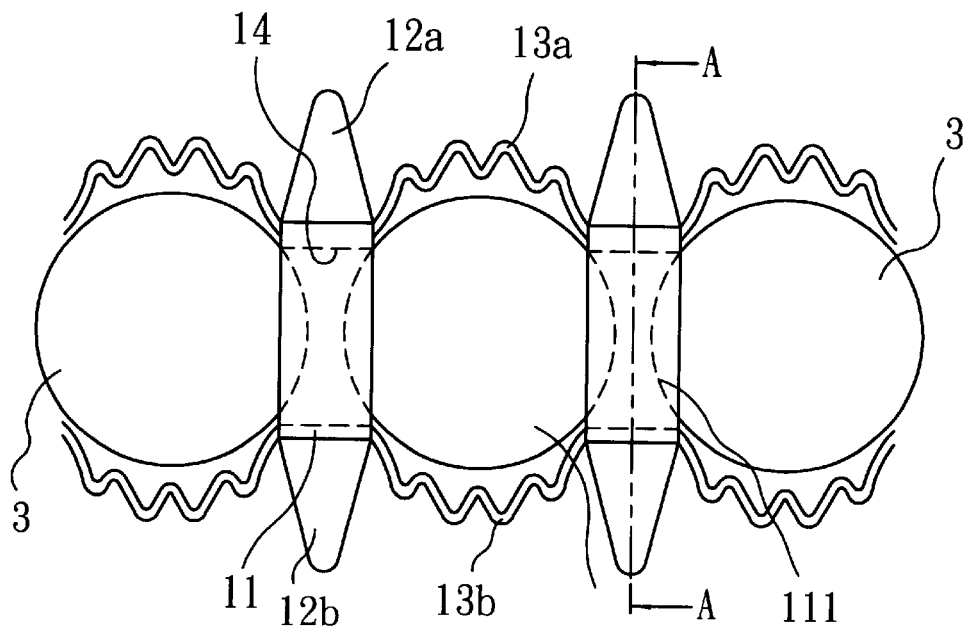
FIG. 5 is a schematic view in a third embodiment of the present invention.
Figure 6:
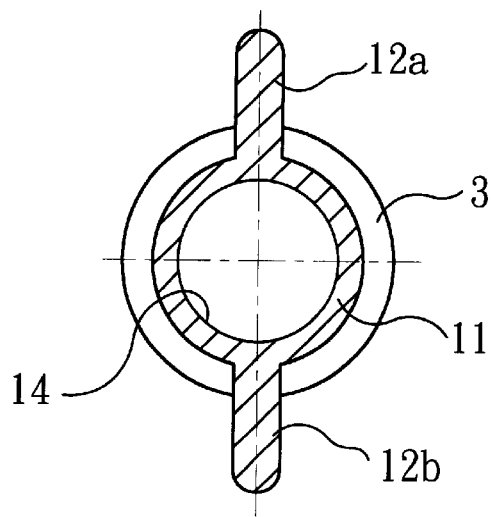
FIG. 6 is the cross sectional view along line A—A of FIG. 5.

FIG. 5 is a schematic view in a third embodiment of the present invention, and FIG. 6 is the cross sectional view along line A—A of FIG. 5. In the third embodiment, a through hole 14 is provided at the center of the spacer 11 to retain the portion of the rolling ball 3 and position it thereat. An additional advantage of the though hole 14 is to provide room for rolling balls 3 to impart lubrication oil one another thereof so as to reduce temperature rise of a ball screw or a linear guide way. Besides, in order to facilitate separating the interconnector 1 from the die cavity after finishing die casting, the through hole 14 plays an important roll thereof. Meanwhile, in this embodiment no inwardly recessed meniscoid surfaces 111 are formed with the spacer 11, this is also helpful for separation of the interconnector 1 from the die cavity at the final stage of fabrication process that the conventional techniques feel annoying very much.

It emerges from the description of the above embodiments that the invention has several noteworthy advantages, in particular:

1. The linking chain geometrically configurated in various forms has good resiliency for elongation and shrinkage such that the guide way tracks are able to be made into any shape which contributes to minimizing the size of the apparatus.
2. Provision of the direction guiding members for the inteconnector enable it to perform three dimensional turning.
3. Provison of the through hole for the spacer contributes to lubrication of the rolling balls thereby reducing temperature rise of the apparatus, and retaining the rolling ball thereat. In addition, it aids separation of the finished product from the die cavity.
4. The aforesaid advantages can be carried out with a low production cost without reducing the amount of load carrying rolling balls.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An interconnector for rolling balls comprising:
   a spacer located between two adjacent rolling balls to separate them;
   two linking chains formed into a meandering narrow strip shape;
   said linking chain and said spacer are made of a elastic material,
   said two adjacent spacers are connected with said two linking chains.

2. The interconnector of claim 1, wherein a direction guiding member with two direction guiding wings is provided for said spacer.

3. The interconnector of claim 2 wherein the thickness of said direction guiding wing is approximately equal to that of said linking chain.

4. The interconnector of claim 2, wherein said direction guide wing is tapering its both edges towards their ends thereof.

5. The interconnector of claim 1, wherein said linking chain is configurated in a sinuous form.

6. The interconnector of claim 1, wherein said linking chain is configurated in a serrated form.

7. The interconnector of claim 1, wherein said spacer is formed into an inwardly recessed meniscoid contact surface at both sides thereof for retaining the rolling balls.

8. The interconnector of claim 1, wherein said spacer is provided with a through hole.

9. The interconnector of claim 1, wherein said interconnector is to be used in the rolling ball circulation system of a ball screw.

10. The interconnector of claim 1, wherein said interconnector is to be used in the rolling ball circulation system of a linear guide way.

11. The interconnector of claim 1, wherein the cross section of said spacer is a circle.

12. The interconnector of claim 1, wherein the cross section of said spacer is a rectangle.

* * * * *